(12) United States Patent
Naik (10) Patent No.: US 8,612,987 B2
(45) Date of Patent: Dec. 17, 2013

(54) PREDICTION-BASED RESOURCE MATCHING FOR GRID ENVIRONMENTS

(75) Inventor: Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 1850 days.

(21) Appl. No.: 11/623,220

(22) Filed: Jan. 15, 2007

(65) Prior Publication Data

US 2008/0172673 A1 Jul. 17, 2008

(51) Int. Cl.
*G06F 9/46* (2006.01)
(52) U.S. Cl.
USPC .......................................................... 718/104
(58) Field of Classification Search
None
See application file for complete search history.

(56) References Cited

U.S. PATENT DOCUMENTS

| | | | | |
|---|---|---|---|---|
| 6,016,503 | A | * | 1/2000 | Overby et al. ................. 718/104 |
| 7,386,850 | B2 | * | 6/2008 | Mullen .......................... 718/104 |
| 7,668,703 | B1 | * | 2/2010 | Rolia et al. ....................... 703/2 |
| 2005/0172291 | A1 | * | 8/2005 | Das et al. ...................... 718/104 |

OTHER PUBLICATIONS

Feitelson, D., et al., "Parallel Job Scheduling—A Status Report", Presented at 10th Workshop on Job Scheduling Strategies for Parallel Processing, pp. 1-9, NY 2004.

Maheswaran et al., "Dynamic Matching and Scheduling of a Class of Independent Tasks onto Heterogeneous Computing Systems", In Proceedings of the 8th Heterogeneous Computing Workshop, (HCW '99), cosponsors: IEEE Computer Society and Office of Naval Research, San Juan, Puerto Rico, Apr. 1999, pp. 1-15.

Raman et al., "Policy Driven Heterogeneous Resource Co-Allocation with Gangmatching", In Proceedings of HPDC-12, pp. 1-10, 2003.

Liu et al., "Design and Evaluation of a Resource Selection Framework for Grid Applications", In proceedings of HPDC-11, pp. 1-13, 2002.

Kumar et al., "Modelling the Global Optimization Problem in Highly Available Distributed Environments", Presented at the 4th Applied Mathematical Programming and Modeling Conference (APMOD), pp. 1-5, Apr. 2000, Brunel University, London.

* cited by examiner

*Primary Examiner* — Gregory A Kessler
(74) *Attorney, Agent, or Firm* — Jose Gutman; Fleit Gibbons Gutman Bongini & Bianco PL (57) ABSTRACT

A method, grid computing environment, and information processing system for managing resource requests includes receiving information associated with at least one of a current and a past grid workload of a grid computing environment. Information associated with available resource capacity of at least one resource for processing grid workload is received. An expected grid workload at a plurality of future time intervals is predicted based on the information associated with the current and the past grid workload associated with the grid computing environment. A resource capacity available to the grid computing environment at a plurality of future time intervals is predicted based on the information associated with the available resource capacity. Resource capacities and at least one resource for processing at least a portion of the current grid workload are allocated based on at least the predicted expected grid workload and the predicted available resource capacity.

20 Claims, 8 Drawing Sheets

PREDICTION-BASED RESOURCE MATCHING FOR GRID ENVIRONMENTS

FIELD OF THE INVENTION

The present invention generally relates to the field of grid computing environments, and more particularly relates to resource matching within a grid computing environment.

BACKGROUND OF THE INVENTION

As grid environments become more popular, the size and the diversity in terms of resources and jobs are increasing as well. By their nature, individual resources are not under central control and they can enter and leave the grid system at any time. Similarly, job arrivals and job mix are much less predictable than in a dedicated parallel or cluster environment. The existing resource-matching and resource-allocation mechanisms used in grid environments are extensions of the mechanisms that were initially developed for parallel and cluster type of systems which are characterized by centralized control over resources and workload. These mechanisms do not work well in grid environments because they do not scale well with the size of the grid. In addition, because these mechanisms are designed assuming centralized control, when they are used in grid environments, either the grid resources are required to be monitored and controlled in a synchronized manner or the decisions made by the resource-matching mechanisms tend to be inefficient and/or inaccurate. Thus, the existing resource matching mechanisms either curb the flexibility offered by grid environments or they operate inefficiently.

In most cases, the resources considered are of only of one type, e.g., processors, and these are typically homogeneous. Moreover, for performance reasons, resource sharing is not taken into account. Various resource-scheduling schemes have considered the problem of mapping jobs to heterogeneous computing systems. However, these schemes only consider one type of resource and they do not take into consideration simultaneous resource sharing by multiple jobs. Other schemes have proposed modeling methods and algorithms to solve the resource-matching problem. However, these schemes only focus on finding optimal resources for one job with complex resource co-selection requirements.

Therefore a need exists to overcome the problems with the prior art as discussed above.

SUMMARY OF THE INVENTION

Briefly, in accordance with the present invention, disclosed are a method, grid computing environment, and information processing system for managing resource requests. The method includes receiving information associated with a current and at least one of past grid workload of a grid computing environment. Information associated with available resource capacity of at least one resource for processing grid workload is received. An expected grid workload at a plurality of future time intervals is predicted based on the information associated with the current and the past grid workload associated with the grid computing environment. A resource capacity available to the grid computing environment at a plurality of future time intervals is predicted based on the information associated with the available resource capacity. Resource capacities and at least one resource for processing at least a portion of the current grid workload are allocated based on at least the predicted expected grid workload and the predicted available resource capacity.

In another embodiment, a grid computing environment is disclosed. The grid computing environment includes at least one resource having a varying available capacity for processing grid workload for a grid computing environment. The grid computing environment also includes an information processing system for managing resource requests in the grid computing environment. The information processing system includes a grid workload predictor for predicting an expected grid workload at a plurality of future time intervals. A grid resource capacity predictor is also included in the grid computing environment. The grid resource capacity predictor is for predicting a resource capacity available to the grid computing environment at a plurality of future time intervals.

The information processing system is further for receiving information associated with at least one of current and a past grid workload of a grid computing environment. Information associated with available resource capacity of at least one resource for processing grid workload is received. An expected grid workload at a plurality of future time intervals is predicted based on the information associated with the current and the past grid workload associated with the grid computing environment. A resource capacity available to the grid computing environment at a plurality of future time intervals is predicted based on the information associated with the available resource capacity. Resource capacities and at least one resource for processing at least a portion of the current grid workload are allocated based on at least the predicted expected grid workload, and the predicted available resource capacity.

In yet another embodiment, an information processing system for managing resource requests to a grid computing environment is disclosed. The information processing system includes a network interface for communicating with at least one resource of a grid computing environment and at least one service requestor of computing services of the grid computing environment. A processor is communicatively coupled with the network interface. Memory is communicatively coupled with the processor for storing information relating to management of resource requests of the grid computing environment. A grid workload predictor is communicatively coupled with the processor for predicting an expected grid workload at a plurality of future time intervals. A grid resource capacity predictor is communicatively coupled with the processor for predicting a resource capacity available to the grid computing environment at a plurality of future time intervals.

The information processing system is further for receiving information associated with at least one of current and a past grid workload of a grid computing environment. Information associated with available resource capacity of at least one resource for processing grid workload. An expected grid workload at a plurality of future time intervals is predicted, based on the information associated with the current and the past grid workload associated with the grid computing environment. A resource capacity available to the grid computing environment at a plurality of future time intervals is predicted based on the information associated with the available resource capacity. Resource capacities and at least one resource for processing at least a portion of the current grid workload based on at least the predicted expected grid workload and the predicted available resource capacity.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by providing a prediction based resource matching service. One advantage of the present invention is that the prediction based resource matching service analyzes historical patterns associated with a data source and predicts its behavior at a future time interval. A data source is any entity that generates data that can be observed and measured. Examples of data sources are an entity submitting requests for grid services, an entity generating messages, and so on. Entities such as available memory and available CPU cycles are also examples of data sources.

Historical data associated with the arrival patterns of a particular subset of requests (e.g., requests from a particular client, requests of particular type, requests for particular type of resource), enables the prediction based resource matching service to predict the number of such arrivals of similar requests over incremental time steps. Another advantage of the present invention is that the prediction based resource matching service can also be presented with the historical information on the capacity of a particular type of resource available for processing grid workload. Using observations from representative resources of a given type and predictions about the availability of resource instances of a given resource type, future capacity predictions can be made and used in the prediction based resource matching. Similarly, observations from representative resource requesters can be used to predict the total future demand on the system from the entire population of the grid clients.

The predicted demand on the grid resources and the predicted resource capacities available for processing the demand help the system described in this invention to tune its current resource matching decisions so as to maximize key business objectives over a period of time. Since the resource matching decisions made now affect the availability of resources in the future, and hence the ability to process future workload, decisions made without taking into account on future demand can turn out to be short sighted. This shortcoming is avoided by the invention described here.

Exemplary System

Figure 1:
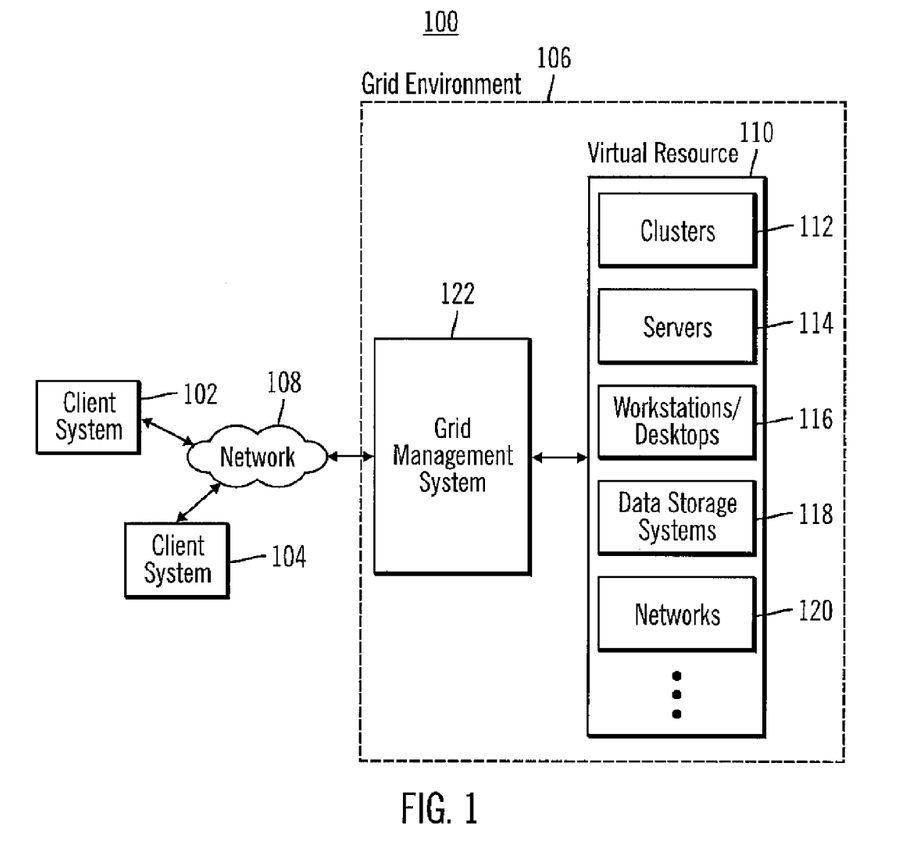
FIG. 1 is a schematic diagram of an exemplary system according to an embodiment of the present invention.

FIG. 1 illustrates an exemplary system according to an embodiment of the present invention. FIG. 1 shows a plurality of client systems 102, 104 interfacing with a grid computing environment 106. The client systems 102, 104, in one embodiment, are information processing systems such as personal computers, workstations, servers, personal digital assistants, smart phones, and the like. A computer program deployed on a collection of such information processing system can also be a client. The client systems 102, 104, in one embodiment are communicatively coupled with the grid environment via a network 108. The network 108 can be a local area network ("LAN"), a wide area network ("WAN"), an Internet Service Provider ("ISP"), and the like.

In the present example, the grid environment 106 enables a client system 102, 104 to interface with at least one physical resource in the grid environment. To the client, the grid resources may appear as a virtual resource 110. The grid management system 122, in one embodiment, matches the grid resources with the client systems 102, 104 and is discussed in greater detail below. Physically, examples of grid resources include, but are not limited to, server clusters 112, multi-processor systems, servers 114, workstations and desktops 116, data storage systems 118, networks 120, and the like. Each of these physical resources may further be described as collections of multiple types of discrete logical resources including, but not limited to, application resources, cpu processing resources, memory resources, and storage resources.

For purposes of illustration, the network locations and types of networks connecting the components within the grid environment 106 are not depicted. It should be understood, however, that the components within the grid environment 106 may reside atop a network infrastructure architecture that may be implemented with multiple types of networks overlapping one another. Network infrastructure may range from multiple large enterprise systems to a peer-to-peer system to a single computer system. Further, it should be understood that the components within the grid environment 106 are merely representations of the types of components within a grid environment. A grid environment may simply be encompassed in a single computer system or may encompass multiple enterprises of systems.

In one embodiment, such as the grid environment 106, is the organization and delivery of resources from multiple discrete systems from multiple administrative policy domains, such that they appear as a cohesive virtual resource 110 to the client systems 102, 104. The client systems 102, 104, server clusters 112, servers 114, workstations and desktops 116, data storage systems 118, and networks 120 may be heterogeneous and regionally distributed with independent management systems, but enabled to exchange information, resources, and services through a grid infrastructure. Further, server clusters 112, servers 114, workstations and desktops 116, data storage systems 118, and networks 120 may be geographically distributed across countries and continents or locally accessible to one another.

It is important to note that client system 102, 104 may represent any computing system sending requests to any of the resources of the grid environment 106. While the systems within virtual resource 110 are depicted in parallel, in reality, the systems may be part of a hierarchy of systems, where some systems within virtual resource 110 may be local to the client system 102, 104, while other systems require access to external networks. Additionally, it is important to note that systems depicted within virtual resources 110 may be physically encompassed within client system 102, 104, such that client system 102, 104 may submit job requests to the resource located within itself.

To implement the resource distribution functions from all resources within the grid environment 106, grid management services provided by grid management system 122 are accessible from each grid resource. Grid management services may be designed according to multiple architectures, including, but not limited to, the Open Grid Services Architecture (OGSA). In one embodiment, the grid environment 106 is created by a management environment which creates a grid by linking computing systems into a heterogeneous network environment characterized by sharing of resources through grid services.

The grid environment 106, as managed by the grid management services distributed across the resources, may provide a single type of service or multiple types of services to the grid clients. For example, computational grids, scavenging grids, and data grids are example categorizations of the types of services provided in a grid environment. Computational grids may manage computing resources of high-performance servers. Scavenging grids may scavenge for CPU resources and data storage resources across desktop computer systems. Data grids may manage data storage resources accessible, for example, to multiple organizations or enterprises. It will be understood that a grid environment is not limited to a single type of grid categorization.

Exemplary Infrastructure

Figure 2:
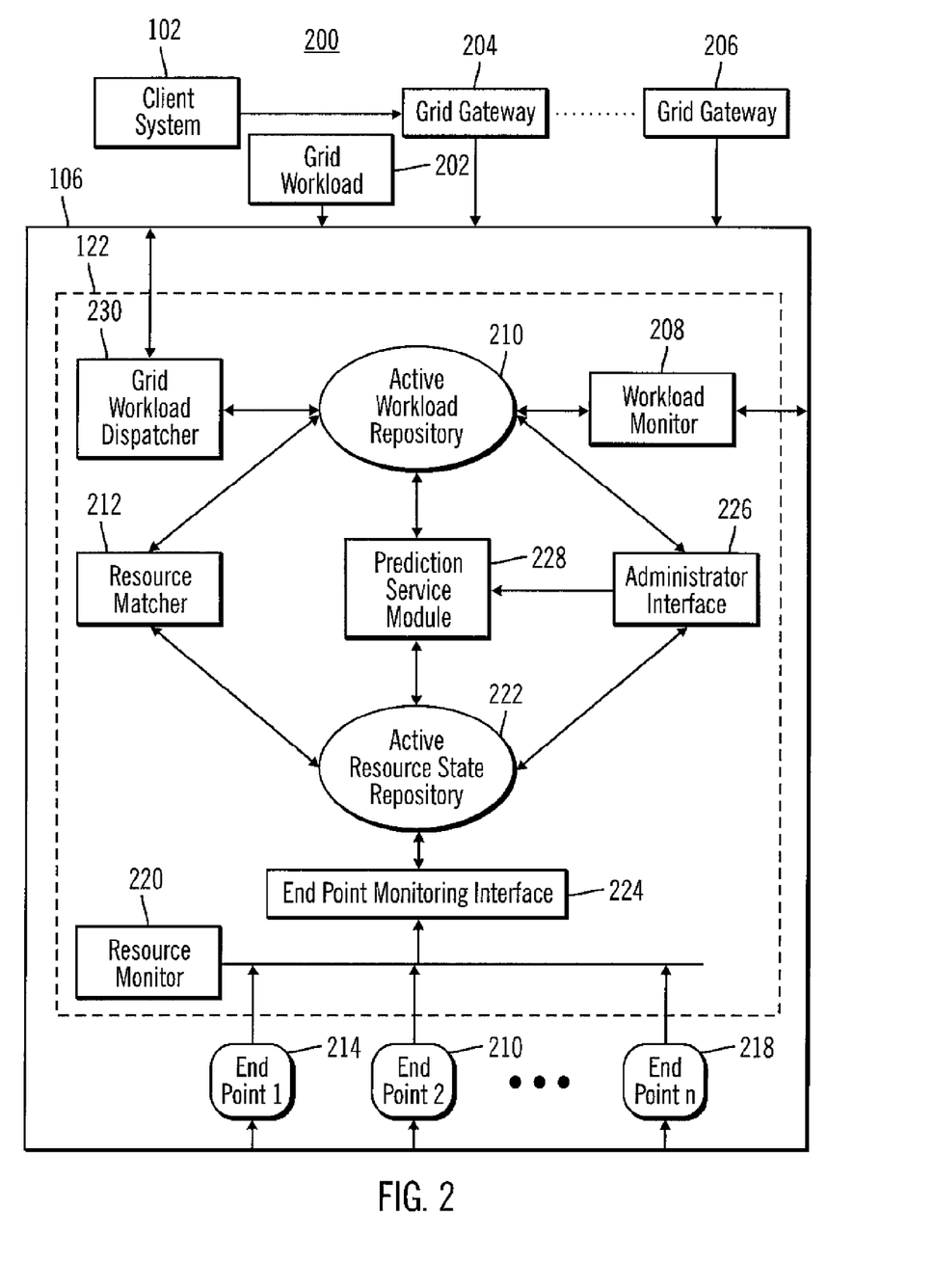
FIG. 2 is a schematic diagram of an exemplary infrastructure for a grid computing environment according to an embodiment of the present invention.

FIG. 2 is a schematic diagram illustrating an exemplary infrastructure 200 for prediction based resource managing for the grid environment 106. In one embodiment, resource managing includes workload scheduling, resource matching, and resource sharing for grid systems. In one embodiment, grid workload 202 is received by one or more grid gateways 204, 206. Grid workload 202 comprises one or more requests submitted by a client system 102 for grid services provided by the grid environment. Each request, in one embodiment, is request for a set of grid services that are delivered by the grid resources by processing data, performing computations, creating new data, and the like.

A request can also be referred to as a job. In one embodiment, a request is associated with client account information, request type, and any input parameters needed to process the request. The request may also include the information on the types of resources needed to process the request. In one embodiment, a request may also indicate preferences for particular type or instances of resources. A request can also include constraints such as the earliest start time to process the request, duration to process the request, a deadline to finish processing the request, processing location specific constraints, and the like.

In one embodiment, the performance and quality of service delivered in processing a request may depend on the type, quality, and the location of the resources used to process the request. A client system 102, in one embodiment, may quantify the business value perceived by the client when the request is processed by a particular set of resources. The quantified business value may be included in the request or may be defined in the client profile available to the grid environment 106.

The grid workload 202 arriving at the grid gateways 204, 206, in one embodiment, is monitored by a workload monitor 208. FIG. 2 shows the workload monitor 208 as a logically centralized entity. However, it should be noted that the workload monitor 208 can be distributed and/or hierarchical in its implementation. The workload monitor 208, in one embodiment, monitors the workload arriving at each grid gateway 204, 206 and obtains information on the type of request, type of resources requested, constraints associated with the request, client information, and the like that is relevant to processing the request. This information, in one embodiment, is then pushed into an active workload repository 210.

In one embodiment, each request is represented and managed by an active object (not shown) in the active workload repository 210. The active object, in one embodiment, is initialized and associated with a request once information associated with the request is received by the active workload repository 210. The active object manages and acts on behalf of the request. The active object performs various functions on behalf of the request such that grid services are delivered using grid resources and the request is processed transparent to the grid client. For example, an active object, in one embodiment, can acquire an appropriate set of resources to process the client request taking into account request specific requirements and constraints; track the progress of the request processing; handle request specific exceptions; return the outcome of the request processing to the requester; and the like. Once an active object is instantiated for a request, it determines the request specific requirements and preferences and invokes a resource matcher 212 to acquire the required set of resources.

FIG. 2 also shows end points 214, 216, 218, which are the end point resources in the grid environment 106. In other words, the end points 214, 216, 218 are the resources 112, 114, 116, 118, 120 shown in FIG. 1. These resources are used to process the requests in the grid workload 202. End points are instances of various types of resources. Examples of resource types are servers, file systems, network subsystems, databases and other middleware components, and the like. For a given type of resource there are multiple instances of that type of resource in the grid environment 106. For example, there can be multiple instances of the server type of resources.

End points can have multiple attributes and each attribute can have a value. For example, a server can have the following attributes: CPU architecture, available and total physical memory, virtual memory, OS type, OS version, IP address, CPU load, and the like. Resources of the same type have the same attributes, but not necessarily the same values of the attributes. An attribute may be static or dynamic depending on whether the attribute value changes with the grid workload being processed. For example, OS type is static since it does not change when some grid workload is being processed. Similarly, total physical memory is a static attribute, but the available memory is a dynamic attribute. Similar to the available memory attribute, CPU load is a dynamic attribute. Dynamic attributes are associated with capacity values that change as a resource is used to process one or more requests.

An end point resource is shared by the grid workload 202; that is, a resource may simultaneously process multiple requests. As one or more requests are processed by a resource, the available capacity of a dynamic attribute of that resource varies. Each attribute has a sharing limit beyond which it cannot be shared or subdivided among a larger number of requests. Additionally, grid resources are heterogeneous. In other words, the capacities associated with an attribute are not the same across multiple instances of the same type of resource. This is because of the physical differences among multiple instances of a particular type of resource. The grid resources are heterogeneous also because of the asynchronous nature of sharing of grid resources by grid workload.

The grid end points 214, 216, 218 are monitored by a resource monitor 220 for determining their availability for processing grid workload 202 as well as for the current capacities of the dynamic resource attributes. FIG. 2 shows the resource monitor 220 as a single centralized entity. However, the resource monitor 220 can be distributed and/or hierarchical. The resource monitor 220, in one embodiment, monitors the end point resources 214, 216, 218 and updates an active resource state repository 222. The updates to the repository 222, in one embodiment are made via an end point monitoring interface 224.

As discussed above, the active object representing a request in the active workload repository 210 invokes the resource matcher 212 to determine a set of resources that meet the resource requirements associated with the request. The resource matcher 212, in one embodiment, is a web service that continuously receives requests for resources from the active objects representing requests in the grid workload 202. The resource matcher 212 periodically takes a snapshot of requests that are yet to be assigned resources. The resource matcher 212 then tries to match unassigned resources with the unmatched requests. The resource matcher 212, in one embodiment, performs this matching process while meeting the resource requirements associated with each request and without violating the capacity constraints associated with the resources.

The resource matcher 212, in one embodiment, queries the active resource state repository 222 to determine the current state of the resources in the form of their attribute values. In one embodiment, resource matching is performed taking into account available grid resources, their attribute capacity values, constraints associated with requests, preferences, request priorities, and any business goals that grid administrators may have setup for the grid environment 106. In one embodiment, the resource matcher 212 is aware of the available resource capacities and the demand in the form of requests in the grid workload 202. Using this information, the resource matcher 212 solves a resource matching problem and then returns the requests with matched resources to the active objects represented in the active workload repository 210. The resource matching process is discussed in greater detail below.

It should be noted that processing a request may require more than one type of resource allocated to that request. For example, a server, a database, a file system, and network may simultaneously need to be allocated to process a request. These resource requirements are specified as dependencies in the request. In addition, a request may specify minimum values of available attribute capacities in order for a resource instance to be considered for processing that request. These are specified as constraints in the request. A request may also have preferences for certain resource instances and these are also specified in the request. These request specific requirements on the capacities of multiple resources are taken into account by the resource matcher 212.

It should also be noted that the grid environment 106 may not have sufficient resources to match all requests with the desired set of resources. Because of this, the resource matcher 212 has to make choices while making resource matching decisions. These choices are not straightforward because requests are satisfied only if all of their resource dependencies are satisfied. In one embodiment, satisfying only a partial set of dependencies is not an option for the resource matcher 212. Requests may remain unmatched while resource capacities are not completely utilized. Therefore, the resource matcher 212 searches through all possible ways of matching available resources with requests without violating the resource capacity constraints The resource matcher 212 searches for a resource match that optimizes one or more objectives or business goals defined dynamically by system administrators or resource owners. Some examples of business goals are: maximize request throughput, maximize resource utilization, load balance across resources, maximize business value of matched resources to the requests, and the like.

In the embodiment shown in FIG. 2, the business goals are defined via an administrator interface 226. These are set in the active resource state repository 222 and forwarded to the resource matcher 212 whenever it queries for the state of the available set of resources. The business goals, in one embodiment, are set as policies and these may be defined as system wide policies or may be assigned to an individual or a group of resources in the system. This ability to associate specific business goals with a specific subset of resources enables the grid management system 122 to effectively manage resources in the grid environment 106, which typically includes multiple administrative domains.

The resource matcher 212 takes into account all the outstanding requests, their requirements, preferences, amount of requested resource capacities, available resource capacities, resource specific policies and over all business goals. Taking these into account, the resource matcher 212 can solve the resource matching problem. This problem may be solved as a search problem where the solution is searched exhaustively using methods such as backtracking or hill climbing. The solution may be obtained using some heuristic such as greedy algorithms. The solution may also be obtained by first formulating the resource matching problem as an optimization problem and the optimization problem is then solved using techniques such as linear programming or evolutionary algorithms. A linear programming ("LP") based resource matcher and its implementation is further discussed in "On-line Resource Matching for Heterogeneous Grid Environments", V. Naik, C. Liu, L. Yang, and J. Wagner, in the Proceedings of 5th IEEE International Symposium on Cluster Computing and the Grid (CCGrid 2005), Cardiff, UK, May 2005, which is hereby incorporated by reference in its entirety. An evolutionary algorithm ("EA") based resource matcher and its implementation is further discussed in "On-line Evolutionary Resource Matching for Job Scheduling in Heterogeneous Grid Environments", V. Naik, P. Garbacki, K. Krishna, and Y. Zhao, in the Proceedings of International Conference on Parallel and Distributed Systems 2006 (ICPADS '06), Minneapolis, Minn., July 2006, which is hereby incorporated by reference in its entirety.

The resource matching method discussed above considers a set of requests currently known to the grid management system 122 and tries to match those with a set of resources taking into account their current available capacities. This type of resource matching can be referred to as static resource matching, since it takes into account only the current state of the grid environment 106. However, this does not always produce the optimal results for achieving the highest business goals. This is because, immediately after determining the matchings for high priority requests, better resources may become available or after matching high quality resources with a low priority request, a higher priority request may appear in the system and equivalent high quality resources may not be available to match with the newly arrived high priority request. This difficulty is common to grid systems because of the dynamic nature of the system. Requests appear in the system continuously but not necessarily at regular intervals. In addition, the resource requirements are not uniform across the requests. Similarly, available resource capacities vary dynamically and non-uniformly because (a) processed requests depart from the system asynchronously, and (b) resources join and depart from the grid system asynchronously.

To overcome this difficulty, one embodiment of the present invention incorporates a prediction service module 228. The prediction service module 228, in one embodiment, is implemented as a web service. The prediction service module 228 analyzes historical patterns associated with a data source and predicts its behavior at a future time interval. If the data source is the request arrivals, then the prediction service module 228 can predict the future arrivals. In the embodiment shown in FIG. 2, the prediction service module 228 receives information on the arrival patterns of grid workload 202 and predicts the workload at one or more time intervals in the future. If the prediction service module 228 is presented with historical data on the arrival patterns of a particular subset of requests (for example, requests from a particular client, requests of particular type, requests for particular type of resource), it can then predict the number of such arrivals of similar requests over the next one or more incremental time steps.

Similarly, if the prediction service module 228 is presented with the historical information on the capacity of a particular type of resource available for processing grid workload, it can then predict the capacity available at one or more time intervals in the future. Just as with the requests, the capacity predictions can be for a particular resource or aggregate capacity for a particular type of resource available to the grid system. The prediction service module 228 can also be used to predict the processing time required to process a given type of request using a given type of resources.

The accuracy of the predictions provided by the prediction service module 228, in one embodiment, depends on the predictability of the data source and the quality of the prediction model used in the prediction service module 228. Most workloads and capacity availability patterns tend to be neither completely predictable nor completely chaotic. Therefore, the predictability in the near future, in one embodiment, is typically higher than the predictability of a data source further out in the future.

The prediction service module 228 is provided with historical data on arrivals (arrival time and the resource requirements) of a class of workload. Administrators, in one embodiment, set policies in the active workload repository 210 via the administrator interface 226. The policies, in one embodiment, identify the workload class to be analyzed by the prediction service module 228. Once the type of workload is identified, the active workload repository 210 invokes the prediction service module 228 and sends historical data on the arrival patterns of that type of workload. Using the historical data, the prediction service module 228 predicts the arrivals of that type of requests at one or more time intervals in the future. These predicted values are returned to the active workload repository 210. The predicted values in turn generate active objects representing future expected requests arriving at the grid environment 106. These active objects in turn request for resources from the resource matcher 212 just as the active objects representing the already arrived real requests.

Administrators, in one embodiment, also set policies in the active resource state repository 130, which trigger it to track the available capacities associated with a class of resources. The active resource state repository 222 sends the historical capacity data to the prediction service module 228, which then returns the predicted capacities available at one or more future time intervals. The resource matcher 212 performs matches for the predicted workload at a future time with the resources predicted to be available at that future time. Since the accuracy of predictions is higher in the near future than farther out in the future, the resource matcher performs not one resource matching, but multiple resource matchings using multiple predictions at multiple time steps in the future before finalizing the resource matching at the current time. The following pseudo code illustrates the prediction based resource matching process.

T0: Current time
T1, T2, T3, . . . future time steps for which predictions are available
W0: workload at time T0
W1, W2, W3, . . . predicted workload at time T1, T2, T3, . . . respectively
C0: resource capacities available for processing grid workload at time T0
C1, C2, C3, . . . predicted available capacities at time T1, T2, T3, . . . respectively
M0: request-resource matches at time T0
M1, M2, M3 . . . request-resource matches at time T1, T2, T3, . . . respectively
Loop over the following steps:
    M0←ComputeResourceMatch (T0, W0, C0);
    M1←ComputeResourceMatch (T1, W1, C1);
    M2←ComputeResourceMatch (T2, W2, C2);
    M3←ComputeResourceMatch (T3, W2, C3);
    . . .
    R0←ResourceOverlap (M0, M1, M2, M3, . . . );
    C0_new←UpdateCapacity (R0, M0, M1, M2, M3, . . . );
    M0_new←ComputeResourceMatch (T0, W0, C0_new);
    Wait till current time is T1;
    T0←T1;
    T1←T2;
    T2←T3;
    T3←. . . ;
    Update predictions at T1, T2, T3, . . .
End loop In one embodiment, the algorithm discussed above is implemented in the resource matcher component 212. In the above algorithm, ComputeResourceMatch( ) function performs request-resource matches given a set of requests and a set of resources. In the first invocation of this function, the resource matching is performed using current known workloads and capacities only. These matchings are assigned to M0. In the second invocation of this function, the resource matchings at time T1 are performed without taking into account the effects of resource matchings represented by M0. These matchings are then assigned to M1 and so on. These resource matching operations are performed in a manner similar to the static resource matching techniques discussed earlier. Since resource matchings M0, M1, M2, M3 . . . are determined independent of one another, they may result in conflicts in terms of allocated resource capacities for the same resources being over allocated to multiple requests. These over allocations (e.g., over and above the available resources at that time) are identified in ResourceOverlap( ) function performed by the active resource state repository 222.

The ResourceOverlap( ) function identifies, for each resource instance, the capacities allocated over all the matchings. If the allocated capacities exceed the physical available capacity of that resource, then the excess allocated capacity is released in the function UpdateCapacity( ), which is computed by the Active Resource State Repository 130. To release the excess capacity, this function, in one embodiment, computes the business value derived in each matching involving the resource. The matchings with the least business value are undone one by one, until the allocated capacity reaches the physical available capacity. The UpdateCapacity( ) function also blocks off resource capacity for future matchings that provide higher business values and hence are not undone while releasing excess allocated capacities. The updated values of the resource capacities are then used to determine the true matchings for the current workload. This final resource matching is then sent to a grid workload dispatcher 230 which then dispatches the workload to the matched set of resources so the request can be processed. As time advances, using the actual request arrivals and monitored resource capacities the predicted values are updated and the cycle is repeated.

It should be noted that the above described algorithm takes into account future expected workload and expected resource capacities and performs the request-resource matchings. Resource sharing is allowed to the extent possible by the physical capacity constraints and the future sharing by workload expected in the future. The number of time steps over which predictions are made depends on the accuracy of predictions. In one embodiment, a feed back mechanism is used determine the accuracy of the predictions by comparing the predicted values with the observed values. The number of future time steps is increased as long as the difference between the predicted and the observed values does not diverge. If it starts to diverge the number of prediction steps is decreased until it reduces to an acceptable level, which can be predefined.

Figure 3:
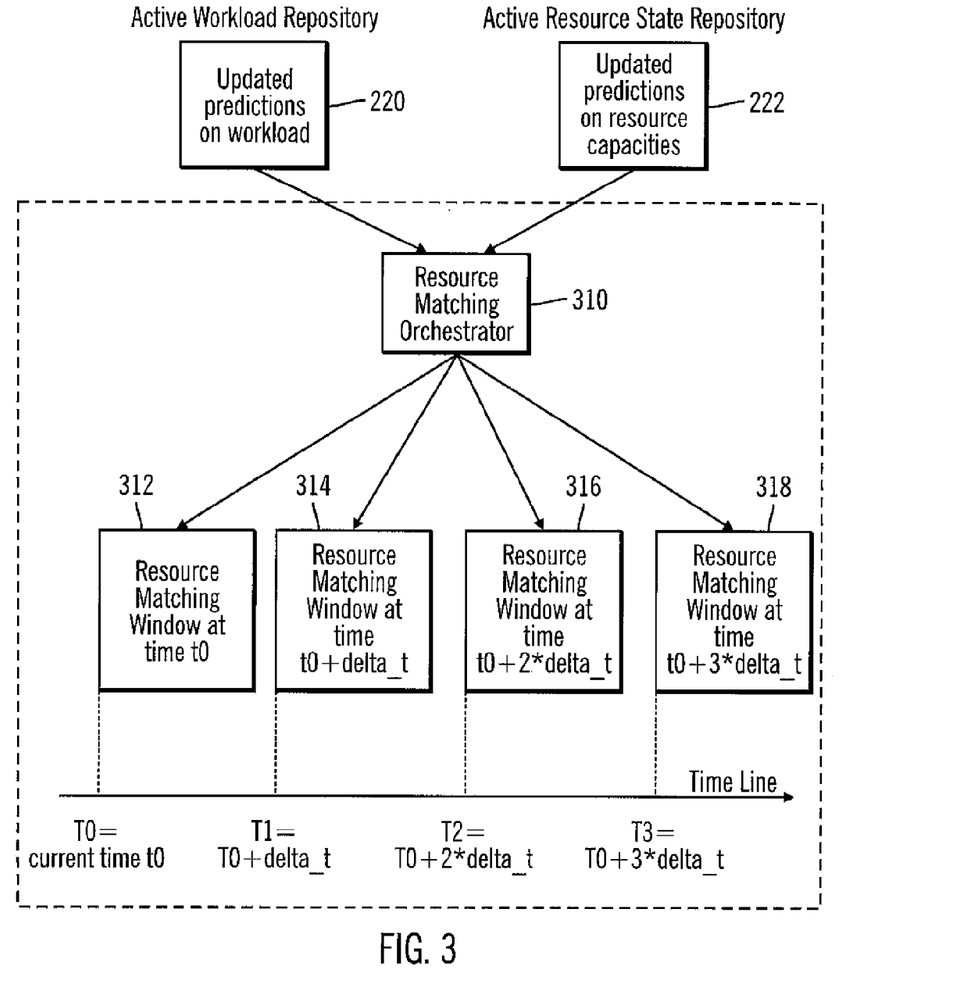
FIG. 3 is a timing diagram illustrating an exemplary timing scheme for resource matching at given points in time according to an embodiment of the present invention.

FIG. 3 is a schematic diagram illustrating one embodiment of the orchestration of the prediction based resource matching algorithm. FIG. 3 illustrates one embodiment of the orchestration carried out by the resource matcher 212 in FIG. 2. In FIG. 3, resource matching orchestrator 310 continuously receives the predicted values of workloads and resource capacities from the active workload repository 220 and the active resource state repository 222. Using these predictions, the resource matching orchestrator 310 then marshals the ComputeResourceMatch( ) function concurrently to determine M0, M1, M2, M3, . . . , at time steps T0, T1, T2, T3, . . . , as shown by the boxes 312, 314, 316, 318, respectively. From M0, M1, M2, M3, . . . , the resource matching orchestrator 310 determines C0_new and then M0_new as discussed above. The resource matching orchestrator 310 then advances all time steps by delta_t so current time T0 corresponds T1, and so on.

Exemplary Resource Matcher

Figure 4:
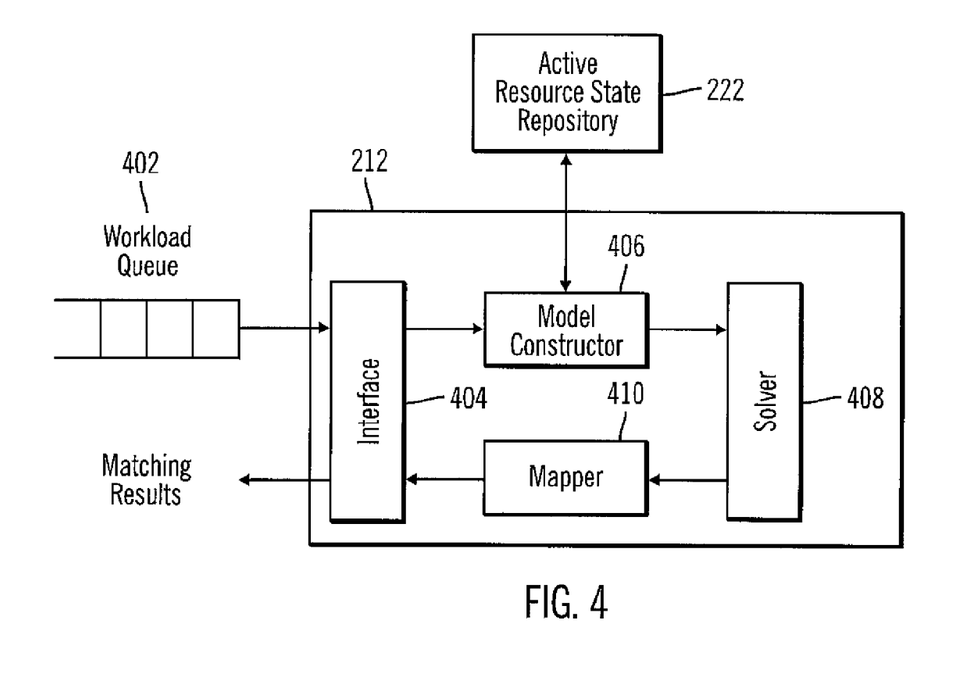
FIG. 4 is a block diagram illustrating a more detailed view of a resource matcher according to an embodiment of the present invention.

FIG. 4 is a block diagram illustrating a more detailed view of the resource matcher 212. In one embodiment, a workload queue 402 is communicatively coupled to the resource matcher 212 The workload queue 402 comprises workload, which is the set of requests requiring resource matches. These are the requests sent by the active objects in the active workload repository 210. An interface 404, in one embodiment, is included in the resource matcher 212. The interface 404, in one embodiment, is the component that receives the requests from the workload queue 402. The interface 404 processes those requests to create the data structures used by the other components of the resource matcher 212. In one embodiment, the interface 404 also translates the final resource matching in the form desired by the clients of the resource matcher 212, which in this case are the active objects.

A model constructor 406 analyzes each request and retrieves the possible set of resources from the active resource state repository 222 that can potentially be matched with the requests. A solver 408, in one embodiment, considers constraints associated with all requests currently being analyzed, resource capacities of the identified resources, current set of resource specific policies and business goals. The solver 408 can then compute the resource matching that satisfies the constraints and optimizes the business goal.

A mapper 410, in one embodiment, maps the outcome of the solver 408 onto the resources in the grid environment 106. This step is needed whenever the solver 408 uses analytical techniques to operate on abstract data where resources and requests may be replaced by variables. The mapper 410 maps these variables onto the actual resources and requests. The resource matching results are sent back the active objects via the interface 404.

Exemplary Prediction Service Module

Figure 5:
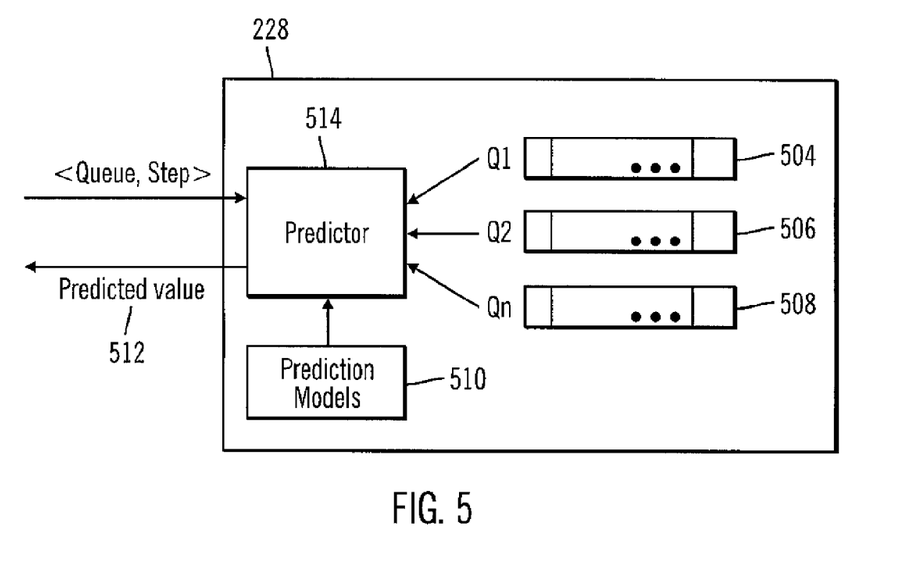
FIG. 5 is a block diagram illustrating a more detailed view of a prediction service module according to an embodiment of the present invention.

FIG. 5 is a block diagram illustrating a more detailed view of the prediction service module 228. For each data source, a buffer such as 504, 506, 508 with a unique queue ID is created. Buffers 504, 506, and 508 are representative examples. Each data source is associated with one such buffer. Data arriving from a data source is tagged with a unique ID. Subsequent data from that data source is then directed towards that buffer using the queue ID. When a data source is initialized, the requestor can also ask for a particular prediction model to use for predicting future behavior of that data source. The prediction service module 228 maintains several prediction models in a prediction model repository 510. Each defined data source in the prediction service module 228 is associated with one or more prediction model known to the prediction service module 228. The prediction service module 228 can handle multiple data sources simultaneously. The predicted values 512 predicted by a prediction module 514 are then returned to the requester. Note that, new observations on a particular data source may be fed continuously while the prediction service module 228 continues to predict the future behavior of the data source.

Overall Process Of Matching Resources To A Grid Workload

Figure 6:
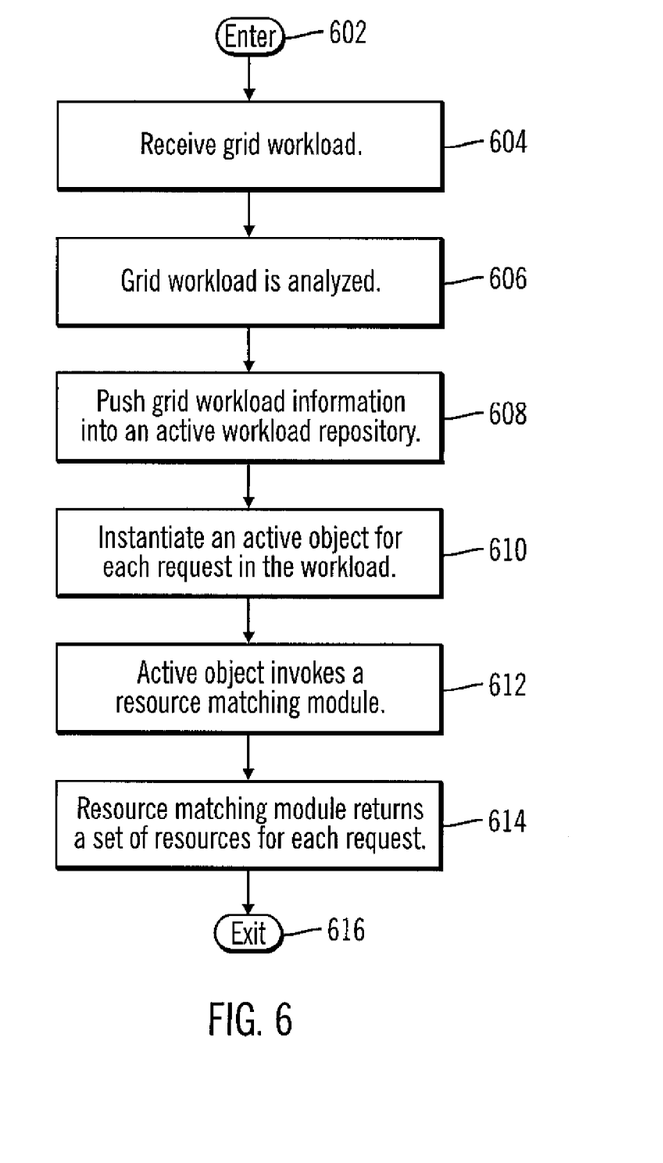
FIG. 6 is an operational flow diagram illustrating an overall process of returning a set of resources for a grid workload according to an embodiment of the present invention.

FIG. 6 illustrates the overall process of matching resources to a grid workload according to an embodiment of the present invention. The operational flow diagram of FIG. 6 begins at step 602 and flows directly to step 604. Grid workload 202, at step 604, is received by one or more grid gateways 204. As discussed above grid workload 202 comprises one or more requests for grid resource submitted by a client system 102. Each request, in one embodiment, is request for a set of grid resources to process data, perform computations, create new data, and the like. The grid workload 202, at step 606, is analyzed. For example, the workload monitor 208, in one embodiment, obtains information on the type of request, type of resources requested, constraints associated with the request, client information, and the like that is relevant to processing the request.

Grid workload information, at step 608, is pushed into an active workload repository 210. An active object, at step 610, is instantiated for each request in the grid workload 202. As discussed above, the active object performs various functions with respect to its associated request. For example, an active object, in one embodiment, requests resources, acquires an appropriate set of resources, dispatches the request to the matched resources, track the progress of the request processing: handle request specific exceptions, return the outcome of the request processing to the requester; and the like. Once an active object is instantiated for a request, it determines the request specific requirements and preferences and invokes a resource matcher 212 to acquire the required set of resources.

The active object, at step 612, invokes a resource matching module 212 to determine a set of resources that meet the resource requirements associated with the request. The resource matcher 212, in one embodiment, is a web service that continuously receives requests for resources from the active objects representing requests in the grid workload 202. The resource matching module 212 matches unassigned resources to each request. The resource matching module 212, at step 614, returns a set of resources to each request in the grid workload 202. The control flow then exits at step 618.

Exemplary Process Of Prediction Based Resource Matching

Figure 7:
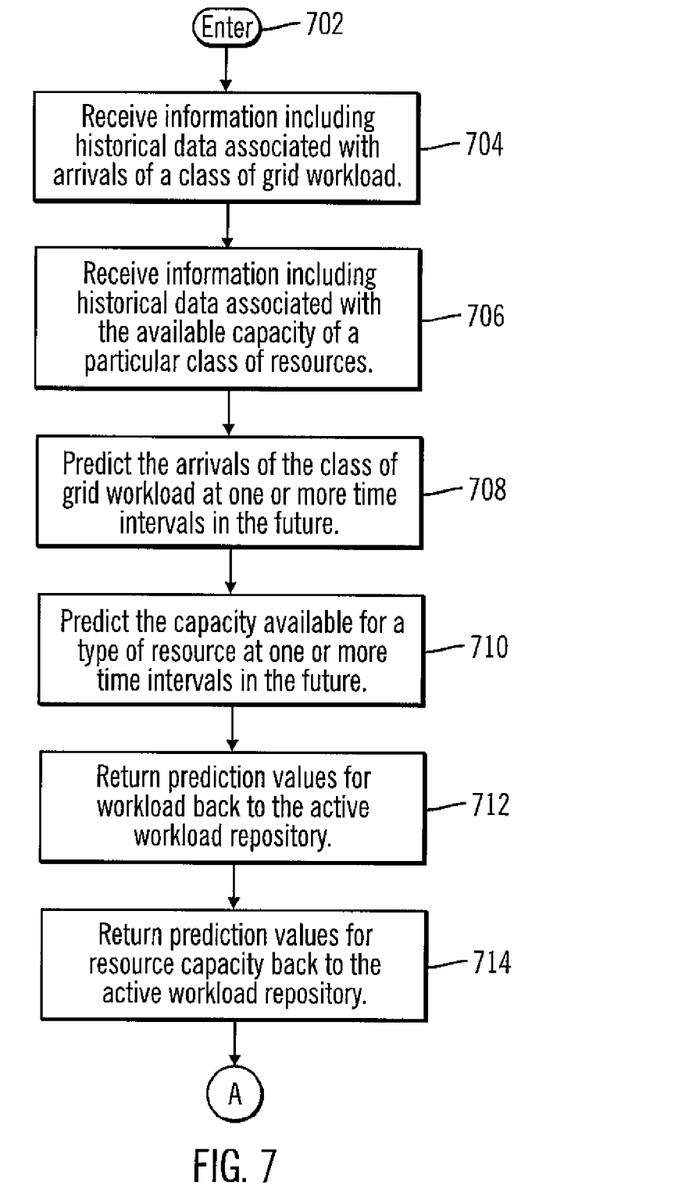
FIG. 7 is an operational flow diagram illustrating an exemplary process of prediction based resource matching according to an embodiment of the present invention.
Figure 8:
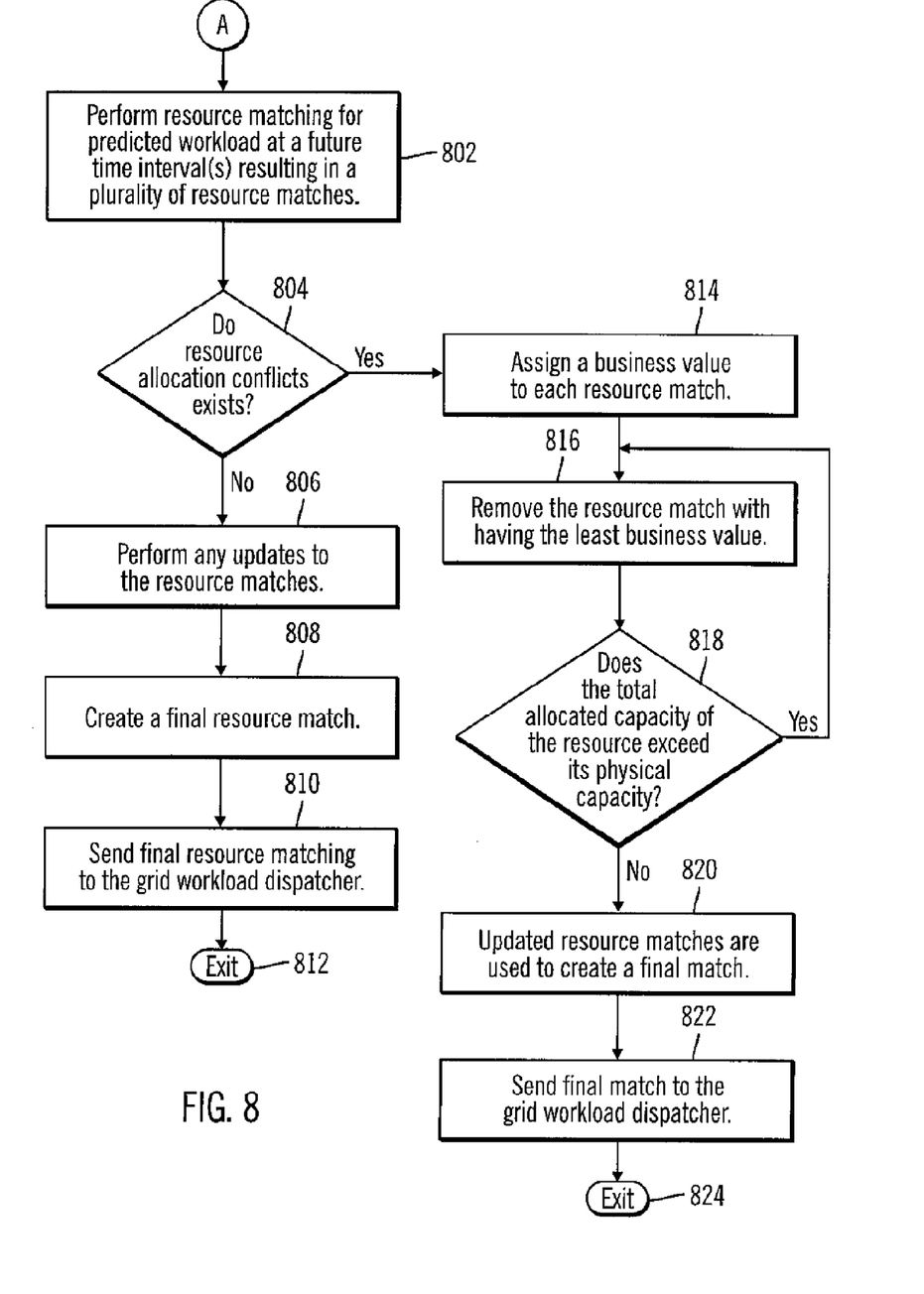
FIG. 8 is an operational flow diagram continuing the process of FIG. 7 according to an embodiment of the present invention.

FIG. 7 and FIG. 8 illustrate an exemplary process of prediction based resource matching according to an embodiment of the present invention. The operational flow diagram of FIG. 7 begins at step 702 and flows directly to step 704. The prediction service module 228, at step 704, receives information including historical data associated with arrivals of a class of grid workload. The prediction service module 228, at step 706, also receives information including historical data associated with the available capacity of a particular class of resources. The prediction service module 228, at step 708, predicts the arrivals of the class of grid workload at one or more time intervals in the future. The prediction service module 228 also, at step 710, predicts the capacity available for a type of resource at the time intervals used for predicting future grid workload. The prediction values for the grid workload, at step 712, are sent back to the active workload repository 210. The prediction service module 228, at step 714, also sends the prediction values for resource capacity back to the active workload repository 210. The control flow then continues to entry point A of FIG. 8.

The resource matcher 212, at step 802, performs resource matching for predicted workload at given time intervals resulting in a plurality of resource matches. In one embodiment, the resource matching is performed using current known workloads and capacities as well as using the predicated future workloads and resource capacities. The grid management system 122, at step 804, determines if resource allocation conflicts exits. For example, in one embodiment, the plurality of resource matches includes a resource match for each time interval in a plurality of given time intervals. Each resource match in the plurality of resource matches is performed independent of the other resource matches, which can result in over allocated resources.

If the result of this determination is negative, the resource matcher 210, at step 806, performs any needed updates to the resource matches. For example, actual workload arrival and resource capacity are monitored. As time advances, this information is used to update the predicted values right up until the point of resource deployment. Then, a final resource match, at step 808, is generated and sent to the grid workload dispatcher 230, at step 810. The control flow then exits at step 812.

If the result of step 804 is positive, a business value, at sep 814 is assigned to each resource match in the plurality of resource matches. The resource match having the least business value, at step 816, is removed from the plurality of resource matches. In one embodiment, resource matches having a business value above a given threshold are prevented from being removed. The grid management system 122, at step 818, determines if the total allocated capacity of the resource exceeds its physical capacity. If the result of this determination is positive, the control flows back to step 816. If the result of this determination is negative, the updated resource matches, at step 820, are used to create a final resource match for the grid workload. The final resource match, at step 822, is sent to the grid workload dispatcher 230. The control flow then exits at step 824.

Non-Limiting Examples

The present invention as would be known to one of ordinary skill in the art could be produced in hardware or software, or in a combination of hardware and software. However in one embodiment the present invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for managing resource requests, the method comprising:
   receiving information associated with at least one of a current grid workload and a past grid workload of a grid computing environment;
   receiving information associated with available resource capacity of at least one resource for processing grid workload;
   predicting, based on the information associated with the current and the past grid workload associated with the grid computing environment, an expected grid workload at a plurality of future time intervals, wherein the expected grid workload comprises expected arrival patterns of requests;
   predicting, based on the information associated with the available resource capacity, a resource capacity available to the grid computing environment at a plurality of future time intervals, wherein predicting the available resource capacity comprises determining an effect of allocating at least one resource in a plurality of resources at one time interval in the set of future time intervals on available resource capacity at multiple subsequent time intervals in the plurality of future time intervals; and
   allocating a set of resource capacities and at least one resource from a plurality of resources for processing at least a portion of the current grid workload based on at least
      the workload predicted at each future time interval in the plurality of future time intervals, and
      the resource capacity predicted at each future time interval in the plurality of future time intervals, wherein the allocating optimizes at least one of an objective and one or more business goals across a current time interval and multiple future time intervals.

2. The method of claim 1, wherein the information associated with the current grid workload includes historical arrival pattern information.

3. The method of claim 1, wherein the information associated with available resource capacity of at least one resource includes historical capacity information.

4. The method of claim 1, wherein allocating the set of resources further comprises:
   matching a set of resources with the expected grid workload predicted at each future time interval in the plurality of future time intervals resulting in a plurality of matchings.

5. The method of claim 4, wherein the matching is based on the predicted available resource capacity of the grid computing environment for each future time interval in the plurality of future time intervals.

6. The method of claim 1, wherein the predicting of the expected grid workload for the plurality of future time intervals further comprises:
   comparing for first time interval, a currently observed grid workload with a predicted expected workload for the first time interval;
   determining if the difference between the currently observed grid workload and the predicted expected workload is above a given threshold; and
   predicting, in response to the difference between the currently observed grid workload and the predicted expected workload being below the given threshold, an expected grid workload for a second time interval.

7. The method of claim 4, further comprising:
   determining a total allocated resource capacity of the at least one resource based on the matching of the set of resources to the predicted expected grid workload predicted for each time interval in the plurality of future time intervals;
   determining if the total allocated resource capacity of the at least one resource exceeds a determined physical resource capacity of the at least one resource; and
   adjusting, in response to the total allocated resource capacity of the at least one resource exceeding the determined physical resource capacity of the at least one resource, at least one matching in the plurality of matchings so that the total allocated resource capacity of the at least one resource is one of at least less than and equal to the determined physical resource capacity of the at least one resource.

8. The method of claim 7, wherein the adjusting further comprises:
   assigning a business value to each of the matchings in the plurality of matchings;
   removing matchings from the plurality of matchings starting with a matching having the least business value until the total allocated capacity of the at least one resource reaches the determined physical capacity of the at least one resource; and
   preventing matchings having a business value above a given threshold from being removed from the plurality of matchings.

9. The method of claim 8, further comprising:
   updating the allocation of the set of resources based on the removing of matchings from the plurality of matchings.

10. The method of claim 1, further comprising:
    updating the predicted expected grid workload for each future time interval in the plurality of future time intervals, based on the information associated with the current grid workload and past grid workload.

11. The method of claim 1, further comprising:
    updating the predicted available resource capacity for the at least one resource for each time interval in the plurality of time intervals based on a determined physical resource capacity and available resource capacity of the at least one resource at a point in time between predicting the available resource capacity of the at least one resource and the occurrence of the time interval.

12. A grid computing environment comprising:
    at least one resource having a varying available capacity for processing grid workload for a grid computing environment; and
    an information processing system for managing resource requests in the grid computing environment, the information processing system including:
      a memory;
      a processor communicatively coupled to the memory;

a grid workload predictor for predicting an expected grid workload at a plurality of future time intervals, and a grid resource capacity predictor for predicting a resource capacity available to the grid computing environment at a plurality of future time intervals, wherein the information processing system further for:

receiving information associated with at least one of a current grid workload and a past grid workload of a grid computing environment;

receiving information associated with available resource capacity of at least one resource for processing grid workload;

predicting, based on the information associated with the current and the past grid workload associated with the grid computing environment, an expected grid workload at a plurality of future time intervals;

predicting, based on the information associated with the available resource capacity, a resource capacity available to the grid computing environment at a plurality of future time intervals;

allocating resource capacities and at least one resource from a plurality of resources for processing at least a portion of the current grid workload based on at least the predicted expected grid workload, and the predicted available resource capacity, wherein the allocating comprises matching a set of resources with the expected grid workload predicted at each future time interval in the plurality of future time intervals resulting in a plurality of matchings;

determining, in response to allocating the resource capacities and the at least one resource for processing at least one of the portion of the current grid workload, that at least one resource allocation conflict exists;

assigning, in response to the determining, a business value to each of the matchings in the plurality of matchings;

removing, in response to the assigning, matchings from the plurality of matchings starting with a matching having a least business value until the total allocated capacity of the at least one resource reaches the determined physical capacity of the at least one resource; and preventing matchings having a business value above a given threshold from being removed from the plurality of matchings.

13. The grid computing environment of claim 12, wherein the information associated with the current grid workload includes historical arrival pattern information, and wherein the information associated with the available resource capacity of at least one resource includes historical capacity information.

14. The grid computing environment of claim 12, wherein the predicting of the expected grid workload for the plurality of future time intervals further comprises:

comparing for first time interval, a currently observed grid workload with a predicted expected workload for the first time interval;

determining if the difference between the currently observed grid workload and the predicted expected workload is above a given threshold; and predicting, in response to the difference between the currently observed grid workload and the predicted expected workload being below the given threshold, an expected grid workload for a second time interval.

15. An information processing system for managing resource requests of a grid computing environment, the information processing system comprising:

a network interface for communicating with at least one resource of a grid computing environment, and at least one service requestor of computing services of the grid computing environment;

a processor communicatively coupled with the network interface;

memory, communicatively coupled with the processor, for storing information relating to management of resource requests of the grid computing environment;

a grid workload predictor, communicatively coupled with the processor, for predicting an expected grid workload at a plurality of future time intervals, and a grid resource capacity predictor, communicatively coupled with the processor, for predicting a resource capacity available to the grid computing environment at a plurality of future time intervals, and wherein the information processing system further for:

receiving information associated with at least one of a current grid workload and a past grid workload of a grid computing environment;

receiving information associated with available resource capacity of at least one resource for processing grid workload;

predicting, based on the information associated with the current and the past grid workload associated with the grid computing environment, an expected grid workload at a plurality of future time intervals, wherein predicting the available resource capacity comprises determining an effect of allocating at least one resource in a plurality of resources at one time interval in the set of future time intervals on available resource capacity at multiple subsequent time intervals in the plurality of future time intervals;;

predicting, based on the information associated with the available resource capacity, a resource capacity available to the grid computing environment at a plurality of future time intervals; and allocating a set of resource capacities and at least one resource from a plurality of resources for processing at least a portion of the current grid workload based on at least the workload predicted at each future time interval in the plurality of future time intervals, and the resource capacity predicted at each future time interval in the plurality of future time intervals, wherein the allocating optimizes at least one of an objective and one or more business goals across a current time interval and multiple future time intervals.

16. The information processing system of claim 15, wherein the information associated with the current grid workload includes historical arrival pattern information, and wherein the information associated with the available resource capacity of at least one resource includes historical capacity information.

17. The information processing system of claim 15, wherein the allocating the set of resources further comprises:

matching a set of resources with the expected grid workload predicted at each future time interval in the plurality of future time intervals resulting in a plurality of matchings.

18. The information processing system of claim 15, wherein the predicting of the expected grid workload for the plurality of future time intervals further comprises:

comparing for first time interval, a currently observed grid workload with a predicted expected workload for the first time interval;

determining if the difference between the currently observed grid workload and the predicted expected workload is above a given threshold; and predicting, in response to the difference between the currently observed grid workload and the predicted expected workload being below the given threshold, an expected grid workload for a second time interval.

19. The information processing system of claim 17, wherein the information processing system is further for:

determining a total allocated resource capacity of the at least one resource based on the matching of the set of resources to the predicted expected grid workload predicted for each time interval in the plurality of future time intervals;

determining if the total allocated resource capacity of the at least one resource exceeds a determined physical resource capacity of the at least one resource; and adjusting, in response to the total allocated resource capacity of the at least one resource exceeding the determined physical resource capacity of the at least one resource, at least one matching in the plurality of matchings so that the total allocated resource capacity of the at least one resource is one of at least less than and equal to the determined physical resource capacity of the at least one resource.

20. The information processing system of claim 15, wherein the information processing system is further for:

updating the predicted expected grid workload for each future time interval in the plurality of future time intervals, based on the information associated with current grid workload and past grid workload; and updating the predicted available resource capacity for the at least one resource for each time interval in the plurality of time intervals based on a determined physical resource capacity and available resource capacity of the at least one resource at a point in time between predicting the available resource capacity of the at least one resource and the occurrence of the time interval.

\* \* \* \* \*